(12) United States Patent
Patelczyk

(10) Patent No.: US 6,550,843 B2
(45) Date of Patent: Apr. 22, 2003

(54) COMPOSITE ROOF BOW FOR AN AUTOMOTIVE VEHICLE

(75) Inventor: Jeffrey S. Patelczyk, Woodhaven, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/910,212

(22) Filed: Jul. 20, 2001

(65) Prior Publication Data

US 2001/0042993 A1 Nov. 22, 2001

Related U.S. Application Data

(62) Division of application No. 09/383,801, filed on Aug. 26, 1999, now Pat. No. 6,282,791.

(51) Int. Cl.⁷ ................................................. B60J 7/00
(52) U.S. Cl. ....................................................... 296/118
(58) Field of Search ......................................... 296/118

(56) References Cited

U.S. PATENT DOCUMENTS

| | | |
|---|---|---|
| 10,422 A | 12/1854 | Raymond |
| 264,203 A | 9/1882 | Smith |
| 268,436 A | 12/1882 | Smith |
| 268,437 A | 12/1882 | Smith |
| 279,016 A | 6/1883 | Raymond |
| 328,526 A | 10/1885 | Sherwood |
| 366,511 A | 7/1887 | Sampsell |
| 730,094 A | 6/1903 | Cole |
| 830,412 A | 9/1906 | Cole |
| 988,083 A | 3/1911 | Ellis |
| 1,672,181 A | 6/1928 | Stokes |
| 1,789,137 A | 1/1931 | Fitch |
| 1,947,682 A | 2/1934 | Swan |
| 2,538,931 A | 1/1951 | Zummach |
| 2,580,337 A | * 12/1951 | Votypka ................ 296/107.11 |
| 2,708,137 A | 5/1955 | Poelman |
| 2,768,023 A | 10/1956 | Landon |
| 2,823,951 A | 2/1958 | Stahl |
| 3,692,354 A | 9/1972 | Tuerk |
| 4,261,615 A | 4/1981 | Deaver |

(List continued on next page.)

FOREIGN PATENT DOCUMENTS

GB 1057247 2/1967

OTHER PUBLICATIONS

Encyclopedia of Polymer Science and Engineering, vol. 7, Fillers, pp. 53, 68–69, 1987.

ASC Incorporated Drawing No. W–39X0–4960–AXXX entitled "1990 Chrysler P–27 Convertible", Sheet 4F, (believed to have been offered for sale or publicly used prior to Aug. 26, 1999).

ASC Incorporated Drawing No. W–63X0–4960–AXXX entitled "1990 Saab Convertible", Sheet 5 (believed to have been offered for sale or publicly used prior to Aug. 26, 1999).

1973 Car Shop Manual, vol. IV, "Part 56–04 Mustang and Cougar Convertible Top" pp. 46–04–01 through 46–04–05.

1971 Fisher Body Service Manual, "Folding Top", pp. 12–1 through 12–24.

*Primary Examiner*—Dennis H. Pedder
*Assistant Examiner*—Jason Morrow
(74) *Attorney, Agent, or Firm*—Harness, Dickey & Pierce, P.L.C.

(57) ABSTRACT

A composite roof bow includes a flexible plastic segment and a rigid reinforcing segment. In another aspect of the present invention, the flexible plastic segment is insert molded to the reinforcing segment. In another aspect of the present invention, the flexible segment is predominately unfilled plastic and the reinforcing segment is filled plastic, which are attached together to create a generally rigid roof bow.

49 Claims, 4 Drawing Sheets

U.S. PATENT DOCUMENTS

| | | |
|---|---|---|
| 4,573,732 A | 3/1986 | Muscat |
| 4,720,133 A | 1/1988 | Alexander et al. |
| 4,720,134 A | 1/1988 | Seifert |
| 4,929,015 A | 5/1990 | Bauer |
| 5,000,507 A | 3/1991 | Baxter |
| 5,009,463 A | 4/1991 | Saitoh et al. |
| 5,026,109 A | 6/1991 | Merlot, Jr. |
| 5,139,307 A | 8/1992 | Koops et al. |
| 5,427,429 A | 6/1995 | Piontek et al. |
| 5,511,844 A | 4/1996 | Boardman |
| 5,540,476 A | 7/1996 | Cowsert |
| 5,560,670 A | 10/1996 | Boardman |
| 5,829,820 A | 11/1998 | Cowsert |
| 6,015,184 A | 1/2000 | Ewing et al. |
| 6,282,791 B1 | 9/2001 | Patelczyk |

* cited by examiner

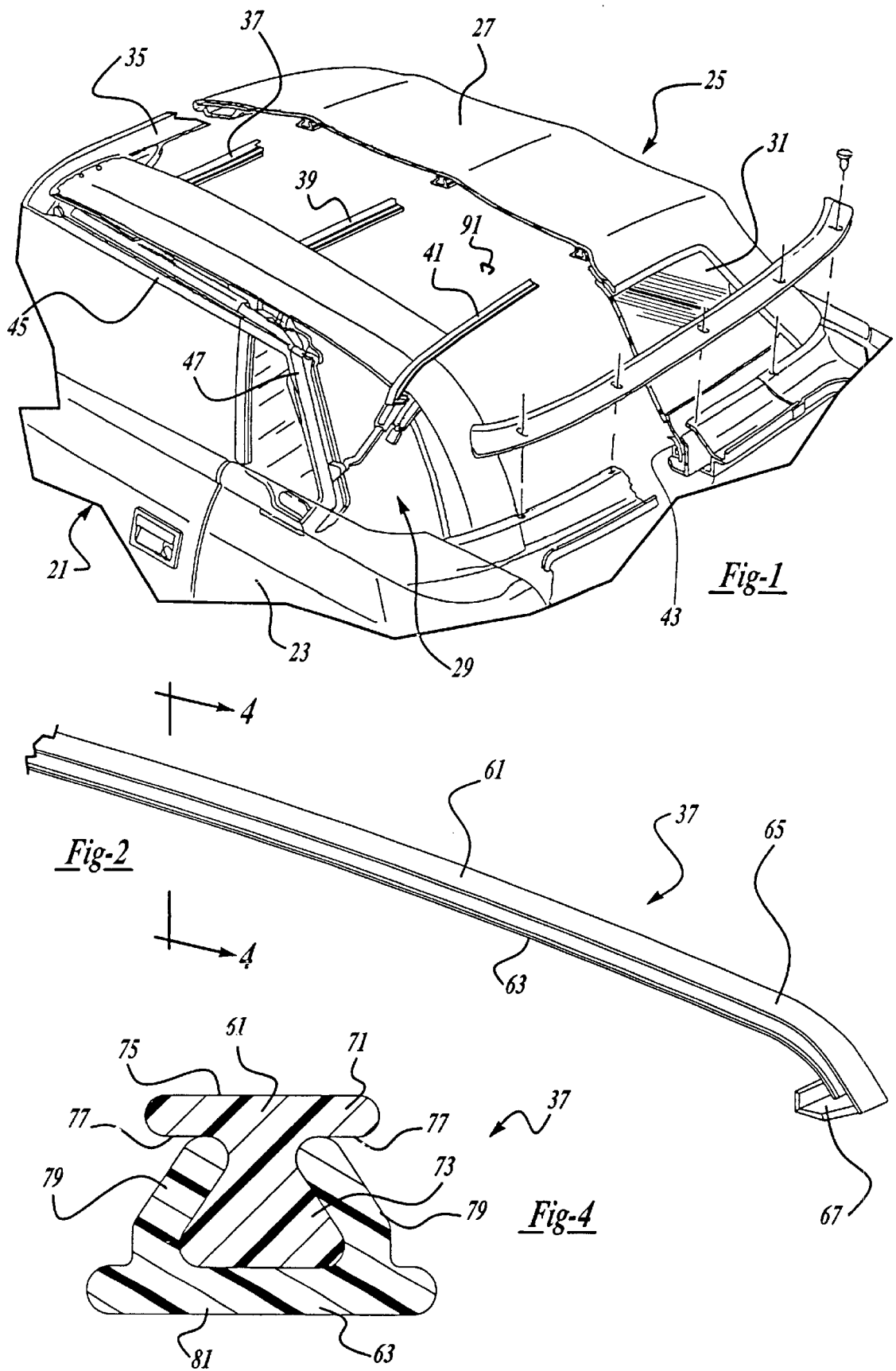

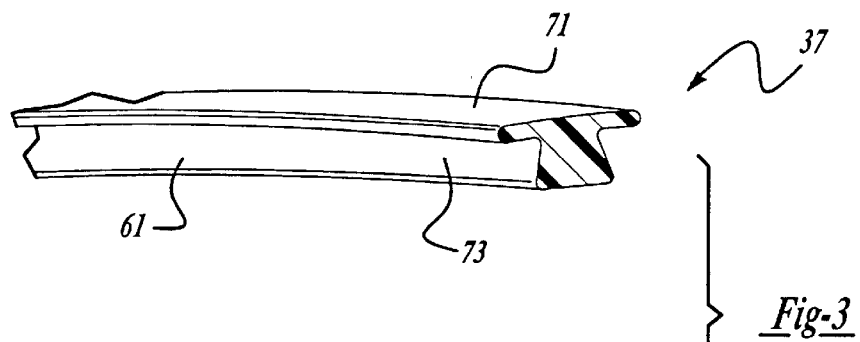
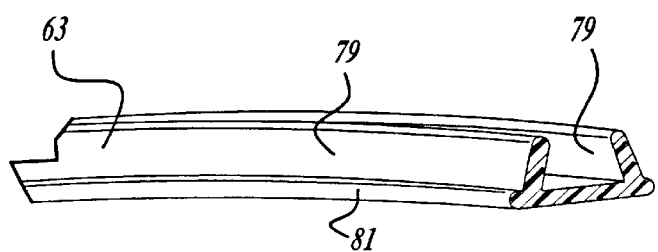
*Fig-3*
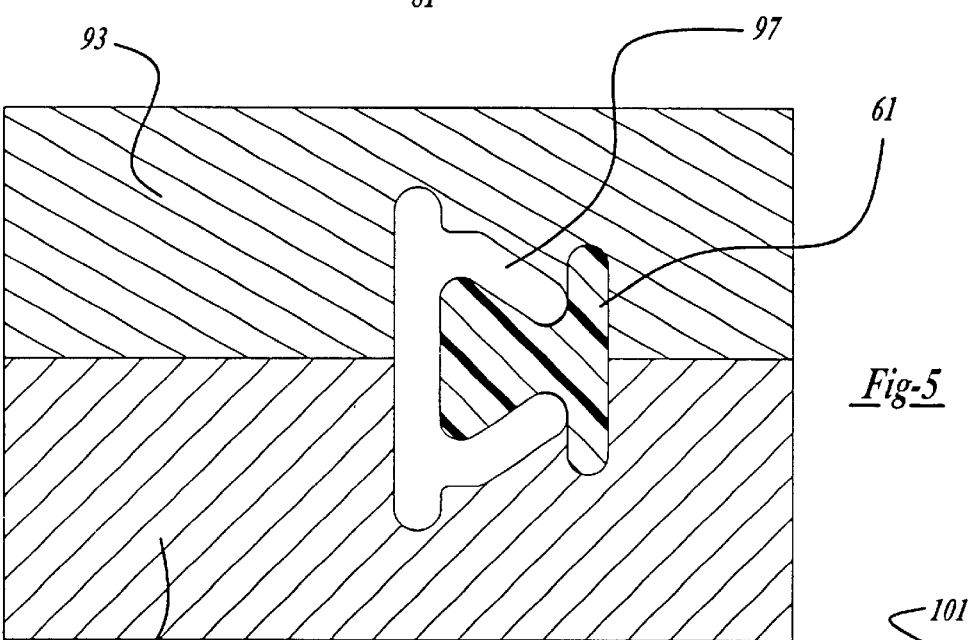
*Fig-5*
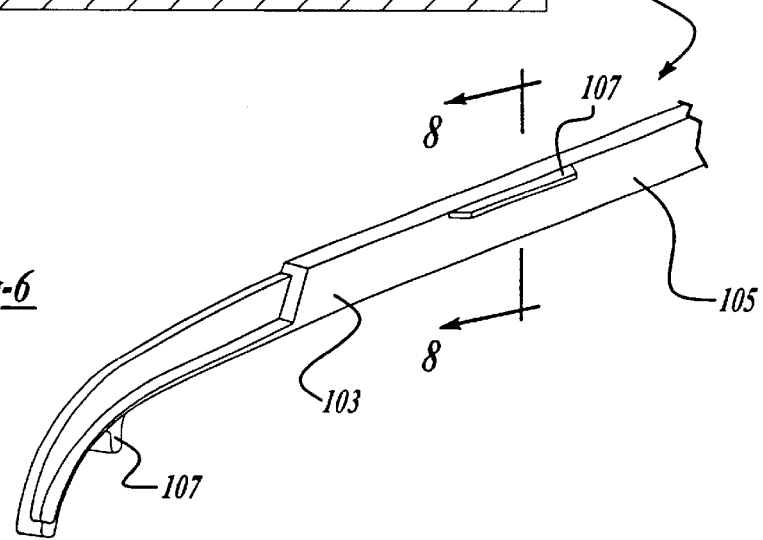
*Fig-6*

COMPOSITE ROOF BOW FOR AN AUTOMOTIVE VEHICLE

CROSS REFERENCE TO RELATED APPLICATIONS

This application is a divisional of U.S. patent application Ser. No. 09/383,801, filed on Aug. 26, 1999, now issued as U.S. Pat. No. 6,282,791.

BACKGROUND AND SUMMARY OF THE INVENTION

This invention relates generally to roof bows and more particularly to a composite roof bow used with an automotive vehicle convertible roof.

It is well known to employ a plurality of roof bows for suspending a soft top convertible roof above a passenger compartment of an automotive vehicle. The roof bows are secured to the top by way of staple-like fasteners or placement of each bow within a pocket sewn to the lower side of the convertible roof. The soft top roof is commonly secured to the number one or forwardmost roof bow by being sandwiched between the number one bow and a trim panel. The roof bows are usually metal and extend in a cross-car manner between metal side rails which are oriented in a generally fore and aft manner. For example, a roof bow and side rail top stack mechanism are disclosed in U.S. Pat. No. 4,720,133 entitled "Convertible Top Structure" which issued to Alexander et al. on Jan. 19, 1988, the disclosure of which is incorporated by reference herein. Such traditional convertible roofs are movable from a raised and operable position covering the passenger compartment, to a stowed and retracted position in a bootwell between the passenger compartment and vehicle trunk.

Some conventional roof bow constructions have also attempted to combine metal with other assembled materials. For example, reference should be made to the following U.S. Pat. No. 5,560,670 entitled "Top Bow Tack Strip" which issued to Boardman on Oct. 1, 1996; U.S. Pat. No. 2,580,337 entitled "Folding Top Structure" which issued to Votypka on Dec. 25, 1951; U.S. Pat. No. 2,538,931 entitled "Bow and Tacking Strip Assembly" which issued to Zummach on Jan. 23, 1951; U.S. Pat. No. 1,789,137 entitled "Reinforced [sic] Wooden Bow and Method of Manufacture Thereof" which issued to Fitch on Jan. 13, 1931; and U.S. Pat. No. 366,511 entitled "Carriage Bow" which issued to Sampsell on Jul. 12, 1887. The wood roof bows are heavy, expensive to shape and are not dimensionally stable in wet weather. Moreover, for the versions employing unfilled plastic, the plastic bows appear to be relatively flexible and offer little freestanding structural support over the great distances spanned, especially when it is considered that the vehicle is often moving at high speeds on rough roads.

U.S. Pat. No. 5,427,429 entitled "Convertible Top Bow" which issued to Piontek et al. on Jun. 27, 1995, discloses a glass reinforced polymeric roof bow. Metal linkage hardware can be molded in place at the ends of the polymeric bow. While this patent is a significant improvement in the industry, it is desirable to further improve the characteristics of a rigid plastic roof bow by providing an additional metal insert in an area of the bow between the roof rail engaging ends.

In accordance with the present invention, a preferred embodiment of a composite roof bow includes a flexible plastic segment and a rigid reinforcing segment. In another aspect of the present invention, the flexible plastic segment is insert molded to the reinforcing segment. In another aspect of the present invention, the flexible segment is predominately unfilled plastic and the reinforcing segment is filled plastic, which are attached together to create a generally rigid roof bow. Still a further aspect of the present invention provides a metal reinforcing segment entirely disposed inside the plastic segment and the plastic segment has a generally I-cross sectional shape. In yet another aspect of the present invention, a reinforcement extends at least a majority of the cross-car length of the plastic bow. A method of making an automotive vehicle roof bow is also provided.

The composite roof bow of the present invention is advantageous over traditional bows in that the present invention advantageously uses the relatively lightweight and rigid property of a filled plastic while also minimizing brittle fracture of the plastic by employing either an unfilled plastic or a metallic reinforcement. The present invention is also advantageous by employing a low piece cost and fast method of manufacturing the composite bow with a minimal amount of manual assembly. The present invention achieves predictable tolerances regardless of environmental humidity while also employing relatively few parts to assemble the bow to a soft top convertible roof. Additional advantages and features of the present invention will become apparent from the following description and appended claims, taken in conjunction with the accompanying drawings.

BRIEF DESCRIPTION OF THE DRAWINGS

FIG. 1 is a partially exploded and sectioned perspective view showing a convertible roof employing the preferred embodiment composite roof bow of the present invention;

FIG. 2 is a fragmented perspective view showing the preferred embodiment composite roof bow;

FIG. 3 is a fragmented and exploded perspective view showing the preferred embodiment composite roof bow;

FIG. 4 is a cross sectional view, taken along line 4—4 of FIG. 2, showing the preferred embodiment composite roof bow;

FIG. 5 is a diagrammatic cross-sectional view showing an injection molding tool used to make the preferred embodiment composite roof bow of FIG. 4;

FIG. 6 is a fragmented perspective view showing a first alternate embodiment composite roof bow of the present invention;

DETAILED DESCRIPTION OF THE PREFERRED EMBODIMENT

Figure 7:
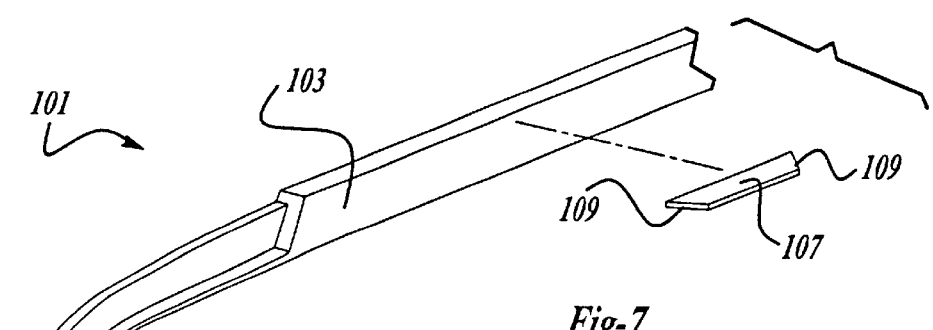
FIG. 7 is a fragmented and exploded perspective view showing the first alternate embodiment composite roof bow.

FIG. 1 illustrates an automotive vehicle 21 having a body 23 and a convertible roof 25. Convertible roof 25 is preferably of a soft top variety including a fabric roof 27, a top stack mechanism 29 and a back window or backlite 31. Top stack mechanism 29 employs a number one roof bow 35, a number two roof bow 37, a number three roof bow 39, a number four roof bow 41 and a number five roof bow 43. Roof bows 35–43 are coupled either directly or indirectly to generally fore-and-aft oriented side rails 45 or rear rail 47 on each side of vehicle 21. Thus, the roof bows extend in a curved and generally horizontally oriented crosscar manner between the sets of rails when convertible roof 25 is disposed in its raised and operable position, as shown. When stowed or retracted, convertible roof 25 is lowered into a bootwell or other storage compartment in body 23.

The preferred embodiment roof bow of the present invention is a two-part composite bow, such as exemplary number two bow 37. However, it must be appreciated that any of the convertible top roof bows can be of the presently disclosed composite construction. Referring to FIGS. 2–4, the preferred embodiment composite roof bow 37 has an unreinforced plastic member 61 and a reinforced plastic member 63 extending throughout a middle segment 65 which is defined as the crosscar portion located between rail fastening ends 67. Unreinforced plastic member 61 is preferably extruded from structurally unfilled nylon 6/6 while reinforced plastic member 63 is preferably injection molded from a 35–50% chopped glass fiber filled nylon 6/6.

Unreinforced plastic member 61 has a modified generally I cross sectional shape defined by an externally visible head 71 and a triangularly enlarged base 73. Head 71 has a flat exterior surface 75 and opposed flat surfaces 77. A pair of inwardly angled arms 79 of reinforced plastic member 63 securely grasp and at least partially encapsulate triangular base 73 therein. Arms 79 of reinforced plastic member 63 depend from the same face of a flat wall 81 (when viewed in cross section like FIG. 4). Rail fastening ends 67 are formed as part of reinforced plastic member 63 and may have a pivot hole or other rail attachment characteristics. Except for ends 67, members 61 and 63 run in a parallel manner and have a generally uniform cross section.

An important characteristic of composite roof bow 37 is that reinforced plastic 63 provides significant tensile and compressive strength will also exhibiting dimensional stability in all environmental conditions. Furthermore, reinforced plastic member 63 is relatively lightweight thereby minimizing top stack actuation forces while enhancing vehicle fuel economy and engine performance. However, reinforced plastic member 63 is somewhat brittle. Therefore, unreinforced plastic member 61 reduces the overall brittleness of composite bow 37 since unreinforced plastic member 61 is a relatively resilient, flexible and fracture resistant component. More specifically, the resilient nature of unreinforced and structurally unfilled (pigment and regrind filling not being considered structural) material reduces brittleness and undesired failure of the composite bow while benefiting from the structural strength of reinforced plastic member 63. Thus, both members 61 and 63 act together to synergistically enhance the overall composite bow characteristics by overcoming any inherent shortcomings of the other materials. Furthermore, head 71 of unreinforced plastic member 61 acts as a tack strip for receiving mechanical fasteners such as staples 91 (see FIG. 1) inserted therein in order to secure top 27 to roof bow 37.

FIG. 5 illustrates an injection molding tool or mold having an upper movable die 93 and a lower die 95 operably associated with an injection molding machine (not shown). First, unreinforced plastic member 61 is extruded in an extrusion die associated with a plastic extrusion machine (not shown). The extrusion machine and extrusion die serve to provide a slight curve to unreinforced plastic member 61 and then member 61 is cut to the desired length. Second, unreinforced plastic member 61 is manually or robotically placed in lower die 95.

Third, lower die 95 is shuttled into a usable position adjacent the injection molding nozzle. Upper die 93 is then closed against lower die 95 and the corresponding section of unreinforced plastic member 61. Thus, unreinforced plastic member 61 is temporarily secured inside the tool while also defining part of the mold cavity 97 which creates the exterior shape of what will become reinforced plastic member 63 (see FIG. 3).

Fourth, the injection molding machine pushes and expels the molten glass filled plastic from the barrel, through the gate of the tool, through a runner system in the tool, and into cavity 97 of the tool. This causes the glass filled plastic to securely and permanently (without destruction) engage and at least partially encapsulate the base of unreinforced plastic member 61 in dies 93 and 95. The reinforced plastic is allowed to cool, thereby solidifying and rigidifying within the tool. Fifth, upper die 93 is opened, lower die 95 is shuttled away from the injection molding machine and the joined members 61 and 63 are removed from the tool, thereby creating a composite roof bow. A non-shuttling, horizontally closing set of dies can also be used. It is alternately envisioned that one of the plastic members could be made of extruded or cast metal, such as aluminum, while the other of the plastic members is glass or otherwise structurally filled, but still using the same process as described with the preferred embodiment.

Figure 8:
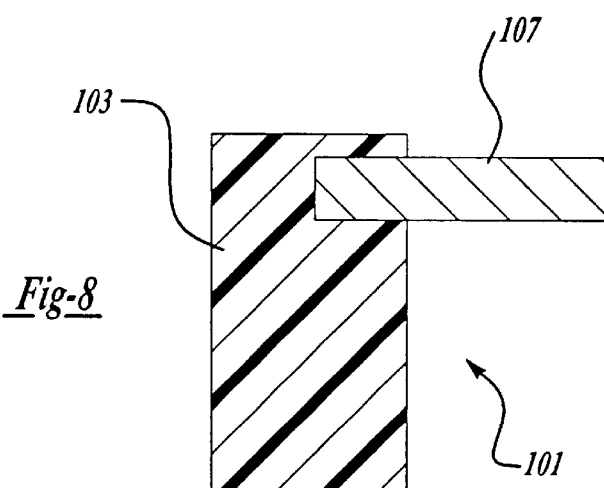
FIG. 8 is a cross sectional view, taken along line 8—8 of FIG. 6, showing the first alternate embodiment composite roof bow.

A first alternate embodiment is shown in FIGS. 6–8. This first alternate embodiment composite roof bow 101 employs a glass filled plastic member 103 having a middle segment 105 spanning between rail fastening ends 107. Reinforced plastic member 103 has a uniform and generally rectangular cross sectional shape throughout middle segment 105. Two or more crosscar-elongated metallic members 107 are locally insert molded partially within reinforced plastic member 103 at load intensive locations. These unreinforced or metal insert members 107 are spaced apart from each other, have a generally horizontal orientation (when in the raised position) and have a generally rectangular cross section. The leading and trailing edges 109 of each insert member 107 are tapered. Insert members 107 are stamped aluminum or steel which are partially encapsulated during the injection molding process. It is alternately envisioned that rectangular insert member 107 can continuously extend as a single elongated piece from middle segment 105 of reinforced plastic member 103. Thus, insert member 107 provides ductility, resilience and fracture resistance while reinforced plastic member 103 is lightweight and structurally strong.

Figure 9:
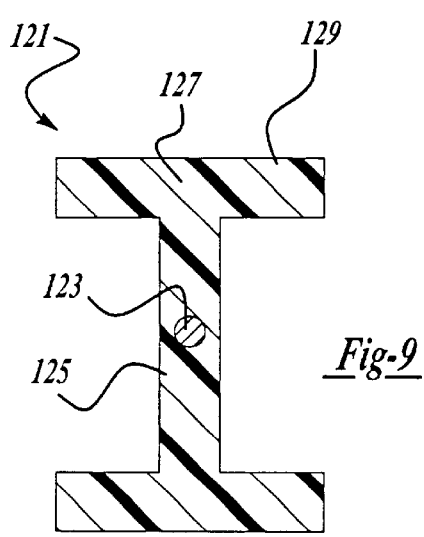
FIG. 9 is a cross sectional view, similar to that of FIG. 4, showing a second alternate embodiment composite roof bow of the present invention.

A second alternate embodiment of the present invention composite roof bow 121 is illustrated in FIG. 9. In this embodiment, a circular cross-sectionally shaped metal member 123, such as a rod or wire, is insert molded within a web 125 of an I cross sectionally shaped glass filled plastic member 127. Web 125 spans in a perpendicular manner between a pair of parallel and opposed walls 129 thereby defining an I beam shape. Unreinforced metal member 123 continuously extends along the entire middle segment of composite bow 121.

Figure 10:
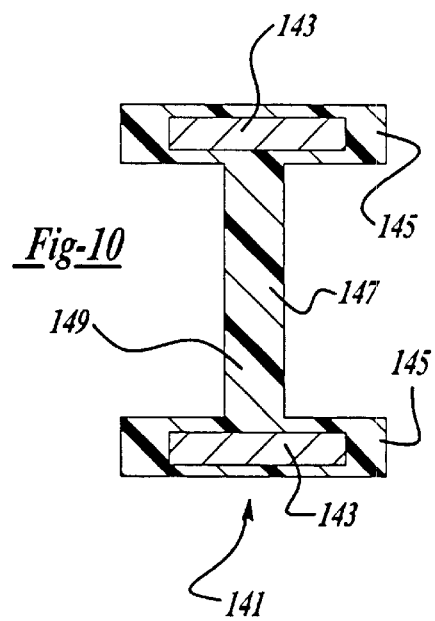
FIG. 10 is a cross sectional view, similar to that of FIG. 4, showing a third alternate embodiment composite roof bow of the present invention.

A third alternate embodiment is shown in FIG. 10. This composite roof bow 141 employs a pair of spaced apart, parallel and continuous unreinforced or metal members 143 insert molded and entirely encapsulated within parallel walls 145 joined together by a web 147. Walls 145 and web 147 are made of a glass reinforced plastic member 149 having a generally I cross sectional shape. Unreinforced insert members 143 are preferably extruded or stamped metal such as aluminum or steel but may alternately be unfilled (in other words, generally absent of a structural filler) plastic.

Figure 11:
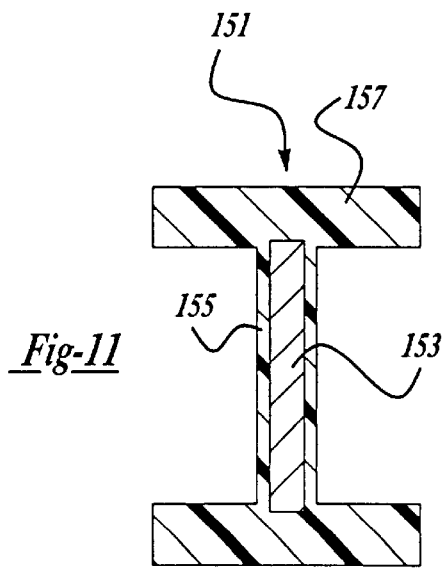
FIG. 11 is a cross sectional view, similar to that of FIG. 4, showing a fourth alternate embodiment composite roof bow of the present invention.

Finally, referring to FIG. 11, a fourth alternate embodiment composite roof bow 151 employs a continuous unreinforced or metal member 153 insert molded within a web 155 of a glass fiber reinforced plastic member 157. Alternately, unreinforced member 153 may consist of multiple spaced apart insert members which are entirely encapsulated or predominantly encapsulated within the injection molded plastic. Plastic member 157 can also be extruded with metal member 153 therein. Various pins or other positioning members may be needed within the injection molding tool to properly locate the unreinforced insert member during injection molding of the reinforced plastic member. It is also envisioned that many of the internal and external corners shown may alternately be slightly rounded to ease flow of the plastic during molding and increase strength of the composite roof bow.

While various embodiments of the composite roof bow have been disclosed herein, other variations may be employed within the spirit of the present invention. For example, other shapes and locations of the reinforced and unreinforced component parts may be provided. Moreover, additional linkages may be needed to couple the roof bow ends to the rails or other top stack components. The composite roof bow of the present invention may also be used with a rigid hardtop roof. While various materials have been disclosed, other materials may alternately be employed as long as the disclosed function is achieved. It is intended by the following claims to cover these and any other departures from the disclosed embodiments which fall within the true spirit of this invention.

The invention claimed is:

1. A composite roof bow comprising a first portion and a second portion, the portions being elongated in a substantially parallel manner, the bow being made in a process including:
   forming the first portion to engage at least part of the second portion, the first portion being made from a material different than that of the second portion, at least one of the portions being a reinforced polymeric material; and
   rigidifying at least one of the portions to affix the portions together in a substantially permanent manner;
   wherein the second portion reduces fracture of the first portion and the first portion resists bending.

2. The roof bow of claim 1 wherein the first portion is a reinforced polymeric material and the second portion is metallic.

3. The roof bow of claim 1 wherein the first portion has a substantially I cross sectional shape.

4. The roof bow of claim 1 wherein the first portion is injection molded from a fiber filled polymeric material and the second portion is formed from a substantially unreinforced polymeric material.

5. The roof bow of claim 1 wherein the second portion is relatively deformable while the first portion is relatively brittle.

6. An automotive vehicle roof bow for use with a roof, the roof bow comprising:
   a relatively fracture resistant member elongated in a first direction; and
   a relatively rigid member elongated in the first direction and having side rail fastening ends, a portion of the rigid member attaching to and surrounding at least a portion of the fracture resistant member between the ends, the rigid member being a filler reinforced polymer;
   wherein at least an elongated portion of the fracture resistant member is exposed outside of the rigid member prior to attachment of the roof bow to the roof.

7. The roof bow of claim 6 wherein the fracture resistant member has a rectangular cross sectional shape.

8. The roof bow of claim 6 wherein the rigid member has a middle segment bordered by the ends, and the fracture resistant member is locally attached to only a minority of the middle segment and spaced away from the ends.

9. The roof bow of claim 6 wherein the fracture resistant member is continuously secured to the rigid member along substantially the entire elongated length of the fracture resistant member.

10. The roof bow of claim 6 wherein the fracture resistant member is metal.

11. The roof bow of claim 6 wherein the filler reinforced polymer of the rigid member includes fibers.

12. The roof bow of claim 6 wherein the fracture resistant member is an unreinforced polymer.

13. An automotive vehicle roof bow comprising:
    an elongated polymeric member having pivotable fastening segments and an intermediate segment spanning between the fastening segments, the intermediate segment having a substantially I-cross sectional shape; and
    at least one metallic member secured to the intermediate segment of the polymeric member.

14. The roof bow of claim 13 further comprising a reinforcing filler material compounded as part of the polymeric member.

15. The roof bow of claim 14 wherein the filler material includes chopped glass fibers.

16. The roof bow of claim 13 wherein at least a majority of the metallic member is located inside the polymeric member.

17. The roof bow of claim 13 wherein the metallic member has a rectangular cross sectional shape.

18. The roof bow of claim 13 wherein the metallic member is continuously secured to the polymeric member along a majority of an elongated length of the polymeric member.

19. The roof bow of claim 13 wherein the metallic member has a substantially circular cross sectional shape.

20. A convertible vehicle roof bow comprising:
    a first elongated polymeric member; and
    a second elongated polymeric member attached to the first member, a majority of the members being elongated in a substantially parallel manner;
    the first member being more rigid than the second member; and
    the second member being more flexible than the first member.

21. The roof bow of claim 20 wherein the members are permanently secured together.

22. The roof bow of claim 21 wherein at least one of the members is injection molded.

23. The roof bow of claim 22 wherein one of the members is extruded.

24. The roof bow of claim 23 wherein the injection molded member at least partially encapsulates the extruded member.

25. The roof bow of claim 20 wherein the first member includes a fibrous material.

26. The roof bow of claim 25 wherein the first member is a chopped fiber filled material.

27. The roof bow of claim 20 wherein the first member is more brittle than the second member.

28. The roof bow of claim 20 further comprising enlarged ends formed from at least one of the members.

29. A convertible roof assembly for an automotive vehicle, the roof assembly comprising:

rails extending in a substantially fore and aft direction;

a roof bow made of an elongated reinforced polymeric portion and an elongated unreinforced second portion, segments of the roof bow being coupled to the rails, the portions extending in a substantially horizontally curved and cross-car manner between the segments of the bow connected to the rails; and a soft top roof substantially spanning between the rails and fastening to the bow.

30. The roof assembly of claim 29 wherein the second portion is an unfilled polymer and the reinforced polymeric section is a fiber filled polymer.

31. The roof assembly of claim 29 wherein one of the portions has a substantially I cross sectional shape.

32. The roof assembly of claim 29 wherein the second portion is continuously secured to the reinforced polymeric portion along a majority of an elongated length of the reinforced polymeric portion.

33. The roof assembly of claim 29 wherein the second portion is metal.

34. The roof assembly of claim 29 further comprising mechanical fasteners operably securing the roof to the roof bow, wherein the fasteners are insertable into the second portion.

35. An automotive vehicle convertible roof system comprising:

a convertible roof movable from a raised position to a retracted position, at east a portion of the roof including a soft-top covering; and a roof supporting member movable with the roof, the member having an elongated polymeric structural portion and an elongated metallic structural portion, the metallic portion being substantially entirely encapsulated within the polymeric portion;

at least a majority of the polymeric and metallic portions being elongated and extending in a substantially parallel and substantially horizontal direction at least when the roof is in its raised position.

36. The convertible roof system of claim 35 wherein the member further comprises a second elongated metallic portion at least partially overlapping and being spaced from the first metallic portion.

37. The convertible roof system of claim 35 wherein the metallic portion has a substantially round cross sectional shape.

38. The convertible roof system of claim 35 wherein the metallic portion has a substantially rectangular cross sectional shape.

39. The convertible roof system of claim 35 wherein the polymeric portion has substantially perpendicularly intersecting segments.

40. The convertible roof system of claim 35 wherein the polymeric portion has a substantially I-cross sectional shape.

41. The convertible roof system of claim 35 wherein the polymeric portion is a filled polymeric material.

42. The convertible roof system of claim 35 wherein the member is a roof bow which extends in a substantially cross-car direction.

43. An automotive vehicle convertible roof system comprising:

a convertible roof movable from a raised position to a retracted position, at least a portion of the roof including a soft-top covering;

a composite roof supporting member movable with the roof, at least a majority of the member including a filler reinforced polymer, the member also including a second structural material located at least in a segment of the member which extends in a substantially horizontal direction at least when the roof is in its raised position.

44. The convertible roof system of claim 43 wherein the second structural material is metallic.

45. The convertible roof system of claim 43 wherein the second structural material is polymeric.

46. The convertible roof system of claim 43 wherein the second structural material has a substantially round cross sectional shape substantially encapsulated inside the filler reinforced polymer.

47. The convertible roof system of claim 43 wherein the second structural material has a substantially rectangular cross sectional shape substantially encapsulated inside the filler reinforced polymer.

48. The convertible roof system of claim 43 wherein the filler reinforced polymer and the second structural material are molded from engineering grade polymers with one of the polymers being molded at least partially inside the other of the polymers.

49. The convertible roof system of claim 43 wherein the member is a roof bow which extends in a substantially cross-car direction.

* * * * *

UNITED STATES PATENT AND TRADEMARK OFFICE
CERTIFICATE OF CORRECTION

Figure 12:
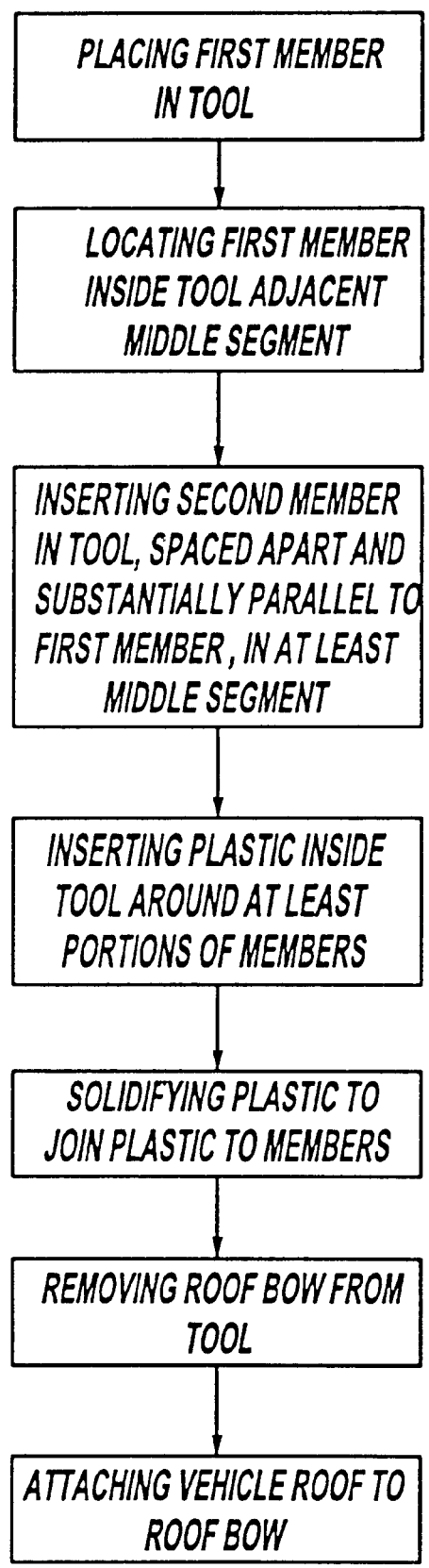

PATENT NO. : 6,550,843 B2
DATED : April 22, 2003
INVENTOR(S) : Jeffrey S. Patelczyk It is certified that error appears in the above-identified patent and that said Letters Patent is hereby corrected as shown below:

Column 2,
Line 57, delete "and",
Line 60, after "invention" delete "," and insert -- ; and
FIG. 12 is a diagram showing the method of making and assembling the first and third alternate embodiment composite roof bows of the present invention. --.

Column 3,
Line 40, "will" should be -- while --.

Column 7,
Line 37, "east" should be -- least --.

Signed and Sealed this

Sixteenth Day of September, 2003

JAMES E. ROGAN
*Director of the United States Patent and Trademark Office*